United States Patent
Carlberg et al.

(10) Patent No.: US 9,662,951 B1
(45) Date of Patent: May 30, 2017

(54) TRUCK STRUT FAIL-SAFE

(71) Applicant: Caterpillar Inc., Peoria, IL (US)

(72) Inventors: James R. Carlberg, Peoria, IL (US); Walter Joseph Laylock, Metamora, IL (US); Sunil I. Mathew, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/988,822

(22) Filed: Jan. 6, 2016

(51) Int. Cl.
| B60G 13/02 | (2006.01) |
| B60G 13/00 | (2006.01) |
| F16F 9/00  | (2006.01) |
| F16F 9/32  | (2006.01) |

(52) U.S. Cl.
CPC ........... *B60G 13/02* (2013.01); *B60G 13/003* (2013.01); *B60G 13/006* (2013.01); *F16F 9/003* (2013.01); *F16F 9/3264* (2013.01); *F16F 9/3271* (2013.01); *B60G 2206/41* (2013.01); *B60G 2300/026* (2013.01)

(58) Field of Classification Search
CPC .... B60G 13/02; B60G 13/003; B60G 13/006; B60G 2206/41; B60G 2300/026; B60G 2400/252; F16F 9/3271; F16F 9/3264; F16F 9/003
See application file for complete search history.

(56) References Cited

U.S. PATENT DOCUMENTS

| 1,544,032 A * | 6/1925 | Potez | B64C 25/64 139/345 |
| 2,856,035 A * | 10/1958 | Rohacs | F16F 9/003 139/161 F |
| 4,744,239 A * | 5/1988 | Kyrtsos | B60G 17/0185 340/438 |
| 4,756,512 A * | 7/1988 | Toms, Jr. | B60G 11/22 188/284 |
| 4,845,975 A * | 7/1989 | Kyrtsos | B60C 23/002 340/438 |
| 4,887,454 A * | 12/1989 | Kyrtsos | B60C 23/002 73/11.07 |
| 4,997,171 A * | 3/1991 | Toms, Jr. | B60G 11/22 267/141.1 |
| 5,437,188 A | 8/1995 | Frantom et al. | |
| 5,950,997 A * | 9/1999 | Metz | F16F 9/56 267/255 |
| 6,443,437 B1 * | 9/2002 | Beyene | B60G 11/22 267/141.1 |
| 6,981,578 B2 * | 1/2006 | Leiphart | B60G 17/08 137/855 |

(Continued)

FOREIGN PATENT DOCUMENTS

| DE | 19922877 | 12/2000 |
| GB | 1511411 | 5/1978 |

*Primary Examiner* — Drew Brown
(74) *Attorney, Agent, or Firm* — Law Office of Kurt J. Fugman LLC

(57) ABSTRACT

A method for protecting the suspension and frame of a vehicle is provided. The method may include providing a first working mode where the strut is at a fully expanded state, providing a second working mode where the strut is at a partially collapsed state, and providing a fail-safe working mode where the strut is at a fully collapsed state. The method may further comprise alerting the user that the strut is operating in the fail-safe working mode and servicing the strut by placing a fail-safe member into the strut.

20 Claims, 2 Drawing Sheets

(56) References Cited

U.S. PATENT DOCUMENTS

| | | | |
|---|---|---|---|
| 2002/0111767 A1* | 8/2002 | Lueschow | G01G 23/3728 702/175 |
| 2003/0011493 A1* | 1/2003 | Wiplinger | B64D 45/0005 340/960 |
| 2006/0191406 A1* | 8/2006 | Kucher | F16J 7/00 92/5 R |
| 2009/0095584 A1* | 4/2009 | Kondo | B60G 11/15 188/267 |
| 2010/0038197 A1* | 2/2010 | Liang | E05F 5/10 188/322.15 |
| 2011/0316209 A1* | 12/2011 | Kerr | B60G 13/02 267/293 |
| 2012/0111999 A1* | 5/2012 | Acks | B64C 25/12 244/102 A |

* cited by examiner

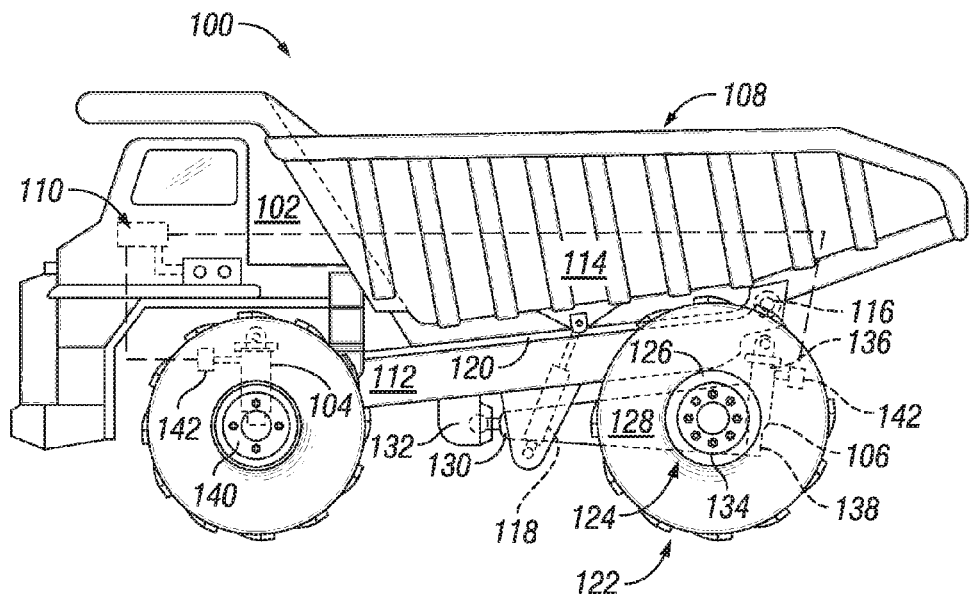
FIG. 1
(Prior Art)
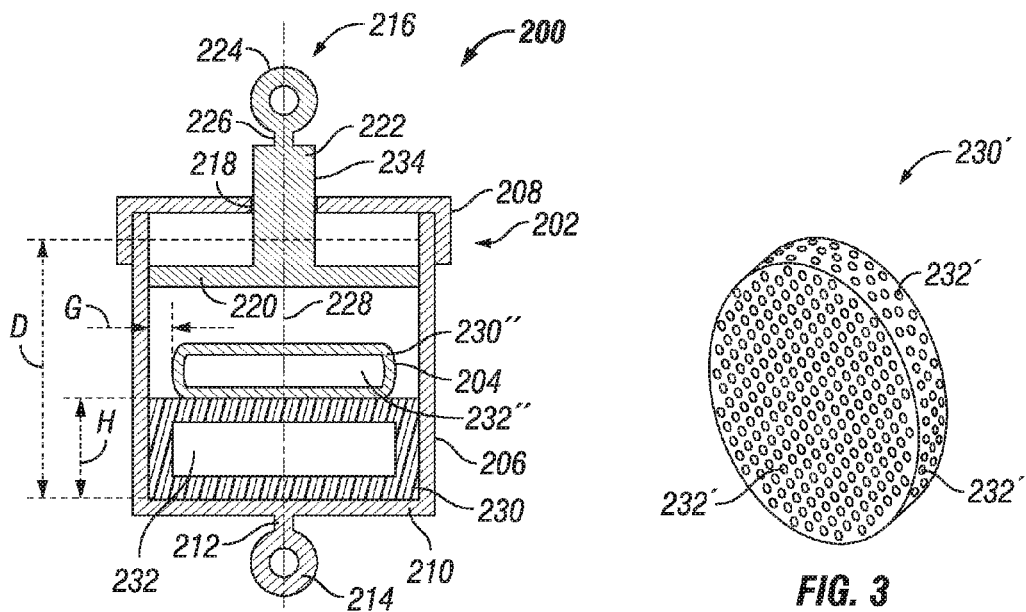
FIG. 2
FIG. 3

TRUCK STRUT FAIL-SAFE

TECHNICAL FIELD

The present disclosure relates to strut assemblies that are constructed to absorb the shock that the axles of trucks and the like encounter when moving on off-road terrain. More specifically, the present disclosure relates to strut assemblies that have members in their cylinders for absorbing shock.

BACKGROUND

Referring now to the drawings, wherein the use of a strut is shown, FIG. 1 illustrates a work vehicle 100 which can be, for example, an off-highway truck 102. The truck has at least one front and rear strut 104, 106 disposed in supporting relation to a material carrying portion 108 of the work vehicle 100. The preferred embodiment has two front and two rear struts which are the gas-over-liquid type commonly known in the industry. It is sufficient in the understanding of the load monitoring system 110 to recognize that the pressure of the fluid, determined by the use of a pressure sensor such as 142, is indicative of the magnitude of the load applied to the strut 104, 106 and that wide swings in the strut pressures are normal and even expected during actual movement of the loaded work vehicle over terrain known as "roading". Moreover, a strut which has lost pressure and collapsed shows little response to "roading" with significantly less variation in strut pressure. Conversely, an under-inflated tire will increase the frequency of the strut pressure variations within the strut supporting that tire. The under-inflated tire has a lower spring coefficient than a properly inflated tire and will resultantly increase the oscillatory response of the suspension with corresponding variations in the damping strut pressure.

The load carrying portion 108 includes a vehicular frame 112 and dump body 114. The dump body 114 is connected to the frame 112 by pivot pin 116 and a hydraulic cylinder 118 such that the contents of the dump body 114 can be removed by controllably pressurizing the cylinder 118 to effect pivotal movement of the dump body 114 about the pivot pin 116. In the transport mode, the cylinder 118 is not pressurized and the weight of the dump body is transferred to the frame through the pivot pin 116 and a support pad 120 fixed to the frame 112.

The work vehicle 100 further includes a ground engaging portion 122 and a suspension means 124 for supporting the load carrying portion 108 in a manner to provide damped oscillatory motion between the ground engaging portion 122 and the load carrying portion 108, thereby reducing the transference of loads and the creation of associated stresses from the ground engaging portion 122, to the suspension means 124, and eventually to the frame 112. The suspension means 124 includes a rear axle housing 126 and an A-frame moment arm 128. The A-frame moment arm 128 has a first end portion 130 pivotally connected to the vehicular frame 112 by a socket 132 and a second end portion 134 fixedly connected to the rear axle housing 126. The first end portion 40 of the A-frame moment arm 128 is a king bolt arrangement, substantially spherical in shape and retained from lateral movement by the socket 132. The rear strut 106 has a first end portion 136 pivotally connected to the vehicular frame 112 and a second end portion 138 pivotally connected to the second end portion 134 of the A-frame moment arm 128. Under load, the rear strut will compress.

Similarly, the front strut 104 will be compressed as the load increases; however, the front strut is connected directly between the frame 112 and a front axle housing 140. A more straightforward relationship exists here in that a force F experienced by the front strut 104 can be determined by measuring the internal pressure of the strut 104, subtracting the front strut pressure corresponding to an unloaded truck, and multiplying the pressure by the area of the strut 104. The reaction force F between the ground engaging portion 122 and the work surface is substantially equivalent to the force F experienced by the front strut 104.

Even though there are alerts when a truck strut is overloaded such as those associated with load monitoring systems, the situation is not always corrected. Operation of the vehicle with a collapsing strut will have obvious effects on the accuracy of the payload monitor owing to the change in the relationship between strut pressure and payload. Other serious consequences also result from such operation. For example, uneven tire wear is an undesirable result of extended vehicle operation with a collapsed strut. Tires are a major operating expense of off-highway trucks and any change in their replacement schedule can have serious impact on profitability. Thus, a collapsed strut can have economic impact other than replacement of the damaged strut. Moreover, a completely collapsed strut results in repeated metal-to-metal contact and the possibility of eventual major structural failure. Frame damage can occur after relatively short periods of operation and the resultant repair costs can be exorbitant.

There are other causes for a collapsed strut other than overloading. For example, struts of various sorts for various types of vehicles may have different working fluids contained in them for the absorption of shock. Often, the cylinders of struts includes a combination of gas and fluid, such as air over oil, air over hydraulic fluid, nitrogen over oil, etc. A typical mixture is hydraulic oil that is used with nitrogen. The separation of the gas from the liquid is important in struts as gas is compressible while the liquid is not. If too much of the gas is entrained into the liquid or otherwise escapes from the cylinder, then the liquid is effectively the only substance present for absorbing the shock. It is not unusual for 60 to 80% of the nitrogen to eventually be entrained into the oil. Unfortunately, liquid such as oil or hydraulic fluid is incompressible; and therefore, is not ideally suitable for absorbing shock as it is instead an effective medium for transferring shock to the frame. Also, when a vehicle is overloaded, the oil and nitrogen will force their way past the seals of the cylinder, reducing the ability of the strut to absorb shock.

For all the above reasons, it is desirable to develop a better strut construction than has yet been devised.

SUMMARY OF THE DISCLOSURE

A strut for use with a vehicle having an axle and a frame is provided. The strut comprises a cylinder that defines an interior space that is typically pressurized, a piston member that is slidably disposed in the cylinder, and a resilient member that is disposed in the cylinder that is configured to absorb shock from the piston as the piston slides in the cylinder, wherein the strut includes an axle attachment structure and a frame attachment structure.

A vehicle is provided that includes a frame, an axle and a strut that comprises a cylinder that defines an interior space, a piston member that is slidably disposed in the cylinder, and a resilient member that is disposed in the cylinder that is configured to absorb shock from the piston as the piston slides in the cylinder, wherein the cylinder includes an axle attachment structure and the piston member includes a frame attachment structure.

A method for protecting the suspension and frame of a vehicle is provided. The method may include providing a first working mode where the strut is at a fully expanded state, providing a second working mode where the strut is at a partially collapsed state, and providing a fail-safe working mode where the strut is at a fully collapsed state.

BRIEF DESCRIPTION OF THE DRAWINGS

FIG. 1 is a side view of a vehicle that includes the use of struts in its suspension system in a manner that is already known in the art.

FIG. 2 is a side sectional view of a strut assembly according to one embodiment of the present disclosure that includes a resilient member having an inner void disposed therein.

FIG. 3 is a perspective view of alternate embodiment of a resilient member that may have a plurality of voids dispersed throughout its body.

DETAILED DESCRIPTION

Figure 4:
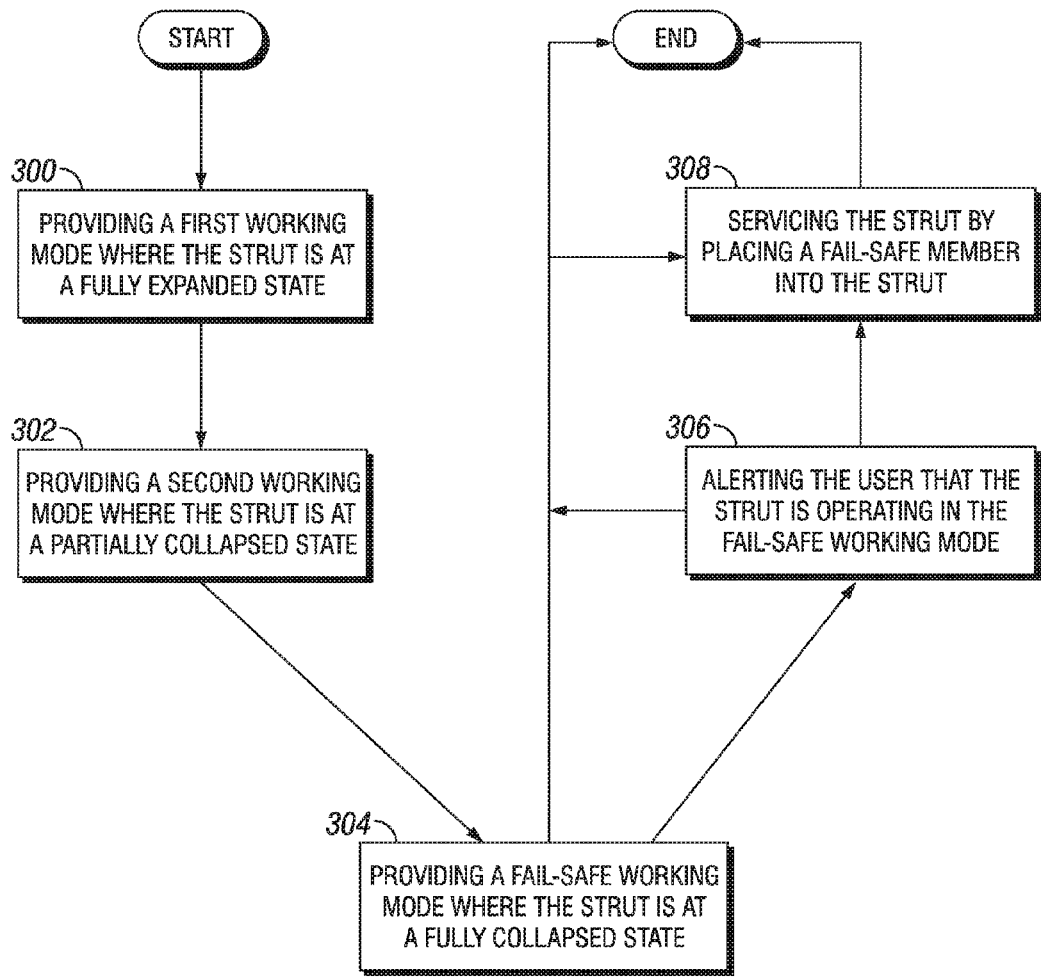
FIG. 4 is a flowchart of a method for protecting the suspension and frame of a vehicle according to an embodiment of the present disclosure.

Focusing now on FIG. 2, a strut 200 that is constructed according to one embodiment of the present disclosure is shown. The strut 200 includes a cylinder 202 that defines an interior space 204 that is typically pressurized. Cylinder pressures vary widely depending on the application. Pressures may range from 20 to 150 psi for cars and light trucks and as high as 650 psi for a heavy haul truck. The cylinder 202 includes a main tube body 206 and a cap or head 208 that are joined and sealed to limit the egress of gas or liquid of any shock absorbing substances contained in the cylinder. The main tube body 206 includes a bottom portion 210 that has projection 212 that extends from it and that defines an axle attachment structure 214. The strut 200 further includes a piston member 216 that is slidably received in the central bore 218 of the head 208. The piston member 216 has a plunger portion 220 and a rod portion 222 that extends upwardly through the bore 218 of the head 208. A vehicle frame attachment point 224 is defined by a projection 226 that extends upwardly from the end of the rod portion 222. The strut is shown in cross-section, but it is to be understood that all of the components have a circular configuration about a central axis 228.

This is just one example of a strut according to an embodiment of the present disclosure and other configurations and styles that are already known or that will be devised in the art are also to be considered to be within the scope of the present disclosure.

A resilient member 230 that is configured to absorb shock from the movement of the axle is disposed in the cylinder proximate the axle attachment structure 214. It is contemplated that the resilient member may be in the middle of the cylinder or even proximate the plunger 220 of the piston 216 in other embodiments. The height H of the resilient member 230 as compared to the total amount of possible displacement D of the piston 216 in the cylinder 202 along the longitudinal axis 228 may range from 20 to 40%. In a collapsed state, the height H of the resilient member may reduce as much as 25 to 50%, meaning that the volume of the resilient member would also be reduced by approximately the same amount.

The resilient member as shown in FIG. 2 is an inflatable membrane that may be constructed of a thermoset elastomer or any other suitable material that is durable enough to withstand repeated shocks and that is chemically compatible with any gas or liquid present in the cylinder. In particular, a polyurethane, a nitrile, Chloroprene or another suitable synthetic rubber may be used. Also, the desired hardness of the material may be a factor. For the embodiment shown, it is contemplated that hydraulic oil that is 60 to 80% entrained with nitrogen may be present on top of the inflatable membrane, knowing that this entrainment process takes place over time. The piston divides the cylinder into an upper chamber and a lower chamber, wherein the upper chamber contains a gas over liquid mixture and the lower chamber contains a gas over liquid chamber, wherein the upper chamber and lower chamber lack fluid communication with each other.

In essence, any resilient member that has an internal sealed void 232 that contains a gas such as air may be used. Other possible gases include nitrogen, air or any other gas typically found in the cylinders of struts.

It is further contemplated that multiple resilient members may be used. For example, FIG. 3 shows an alternate embodiment of a resilient member 230' that contains a plurality of internal sealed voids 232' in it that can compress and expand each time it receives a shock. This version of the resilient member may be made of a thermoset elastomer or any other material that is suitably durable and chemically compatible with fluids found in the cylinder. In particular, a polyurethane, a nitrile, Chloroprene or another suitable synthetic rubber may be used. Again, the hardness of the material may be considered during the selection process. This type of resilient member may be considered a wafer and multiple wafers may be disposed at various places in the cylinder as desired. It is contemplated that various embodiments of the resilient member may have any number, configuration or size of internal sealed voids as needed.

In some embodiments, the internal voids are not pressurized as would be the case if a foamed rubber was used. On the other hand, the internal voids may be all pressurized only some of the voids may be pressurized while others are may not be in the same resilient member.

When the resilient member is pressurized, its internal void may have any suitable pressure, but typically will vary from 20 to 150 psi. In some embodiments, the pressure within a sealed void of the resilient member may be as much as 25% of the internal pressure of the gas/liquid mixture in the cylinder. In other cases, the void pressure may be 50% or greater of the pressure of the cylinder. In yet further embodiments, the void pressure may be substantially equal to that of the cylinder. Typically, the amount of pressure in the void of the resilient member is sufficient to support the load of the vehicle for a limited amount of time should the shock absorbing ability or pressure of the cylinder become ineffective or nonexistent.

Looking again at FIG. 2, a second embodiment of an inflatable member 230" is shown whose diameter is small enough to leave a gap G between its sidewall and the cylinder sidewall. This allows the sidewall of the inflatable membrane to flex as it is loaded especially in the fail-safe mode. The value of the gap may range as needed but typically is targeted around 10 to 20% of the diameter of the inflatable membrane.

In yet another embodiment of a resilient member, when the strut is working in an overload condition, the vertical wall of the elastomer has a first buckle or locking position and the height of the elastomer is never fully recovered to the original height. Thus, indicating to the user that the user is operating in the fail-safe working mode.

In addition, after a number of times of operation in this overload condition there could be for the vertical wall of the elastomer a second buckle or locking position such that the elastomer height is further reduced indicating that the warranty might not be covered due to ignoring the warning condition.

INDUSTRIAL APPLICABILITY

If an inflatable membrane were enclosed in the strut, not as an accumulator, but as a failsafe, the frame damage could be avoided. The inflatable membrane would be designed to match expected strut life at the proper load. It would further be designed to fail after a significant number of overloads. This will cause the strut to bottom out notifying the operator that he or she is in danger of applying damaging fatigue loads. Different functions may be served by the use of multiple resilient members that have different properties or constructions. Alternatively, different parts of the same resilient member may serve different functions such as a resilient member that defines differently shaped or sized internal sealed voids or that has heterogeneous material properties, etc.

A visual cue may be placed on the exterior surface 234 (see FIG. 2) of the rod of the piston of the strut above the head to indicate to a user whether the inflatable membrane has failed and that maintenance is necessary. Also, any resilient member may prevent serious damage should a leak of the fluids in the cylinder occur as metal to metal contact would initially be avoided. Even in this semi-collapsed state, a visual cue may be placed on the exterior surface of the rod of the piston to indicate that only the inflatable membrane is provided shock absorption. These visual cues may entail the use of markings that indicate the position of the piston in the cylinder. A high position would signal a normal operating mode of the strut, a middle position would indicate leaking of the fluids, and a bottom position would indicate that immediate maintenance is needed.

The more a resilient member is relied on, such as increasing its size or using multiple resilient members, the less fluids are necessary to be placed into the cylinder. This is desirable as they are prone to leaking or entrainment of the gas into the liquid which may lead to a decrease in the ability of the strut to absorb shock, creating potential problems with the suspension, tires, and frame of the vehicle.

FIG. 4 depicts a flowchart on how the apparatus described herein may be used to protect the suspension and frame of a vehicle by using a fail-safe member such as the resilient members already discussed. Step 300 includes providing a first working mode where the strut is at a fully expanded state while supporting a load transmitted to the strut through a tire, step 302 represents providing a second working mode where the strut is at a partially collapsed state while supporting a load transmitted to the strut through a tire, and step 304 represents providing a fail-safe working mode where the strut is at its fully collapsed state while supporting a load transmitted to the strut through a tire and preventing metal to metal contact between the piston of the strut and other portions of the cylinder. Once the fail-safe working mode has been reached, the user may continue to work in this mode or preferably may service the strut to fix it. Another step 306 may be provided that includes alerting the user that the strut is in fact operating in the fail-safe working mode. This may be achieved by giving a visual cue or by altering the user via a load monitoring system that uses a sensor (e.g. displacement or pressure sensor, etc.) to determine when various modes of operation are present. Once alerted, it is preferable that the strut be serviced by placing another fail-safe member into the strut (step 308).

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A strut for use with a vehicle having an axle and a frame, the strut comprising:
   a cylinder that defines a pressurized interior space;
   a piston member that is slidably disposed in the cylinder, dividing the cylinder into an upper chamber and a lower chamber, wherein the upper chamber contains a gas over liquid mixture and the lower chamber contains a gas over liquid chamber, wherein the upper chamber and lower chamber lack fluid communication with each other; and
   a resilient member that is disposed in the cylinder that is configured to absorb shock from the piston as the piston slides in the cylinder, wherein the strut includes an axle attachment structure and a frame attachment structure.

2. The strut of claim 1 further comprising a fluid including nitrogen gas and hydraulic fluid that is contained in the cylinder.

3. The strut of claim 1 wherein the resilient member contains at least one internal sealed void.

4. The strut of claim 1 wherein the resilient member is made from one of Chloroprene and nitrile.

5. The strut of claim 1, further comprising a plurality of resilient members that are differently configured one from another.

6. The strut of claim 1, wherein the resilient member is positioned adjacent the axle attachment structure.

7. The strut of claim 1 wherein the cylinder comprises a head that defines a bore and the piston member comprises a rod that is slidably disposed in the bore.

8. The strut of claim 7 wherein the rod defines an exterior surface that is adjacent the head and that includes markings.

9. A vehicle comprising:
a frame
an axle; and
at least one strut that includes a cylinder that defines a pressurized interior space, a piston that is slidably disposed in the cylinder, dividing the cylinder into an upper chamber and a lower chamber, wherein the upper chamber contains a gas over liquid mixture and the lower chamber contains a gas over liquid chamber, wherein the upper chamber and lower chamber lack fluid communication with each other, and an inflatable membrane that is configured to absorb shock from the piston as the piston slides in the cylinder, wherein the cylinder includes an axle attachment structure and the piston member includes a frame attachment structure.

10. The vehicle of claim 9 further comprising a dump body and a load monitoring system.

11. The vehicle of claim 9 further comprising a plurality of struts that include a cylinder that defines a pressurized interior space, a piston that is slidably disposed in the cylinder, and an inflatable membrane that is configured to absorb shock from the piston as the piston slides in the cylinder, wherein the cylinder includes an axle attachment structure and the piston member includes a frame attachment structure.

12. The vehicle of claim 9 wherein the inflatable membrane contains one or more internal sealed voids that are pressurized.

13. The vehicle of claim 12 wherein the void pressure is at least 25% that of the cylinder pressure.

14. The vehicle of claim 13, wherein the void pressure is at least 50% that of the cylinder pressure.

15. The vehicle of claim 14, wherein the void pressure is at least 100% that of the cylinder pressure.

16. The vehicle of claim 9 wherein the inflatable membrane comprises a sidewall that is positioned away from the sidewall of the cylinder forming a gap.

17. The vehicle of claim 9 wherein the inflatable membrane defines a height and the cylinder and piston define a displacement and the ratio of the height of the inflatable membrane to the displacement ranges from 20 to 40%.

18. A method for protecting the suspension and frame of a vehicle using a strut comprising:
providing a first working mode where the strut is at a fully expanded state while supporting a load transmitted to the strut through a tire;
providing a second working mode where the strut is at a partially collapsed state while supporting a load transmitted to the strut through a tire; and
providing a fail-safe working mode where the strut is at a fully collapsed state while supporting a load transmitted to the strut through a tire and preventing metal to metal contact between the piston of the strut and other portions of the cylinder.

19. The method of claim 18 further comprising alerting the user that the strut is operating in the fail-safe working mode.

20. The method of claim 19 further comprising servicing the strut by placing a fail safe member into the strut.

* * * * *